United States Patent [19]

Diefenderfer

[11] 4,149,144

[45] Apr. 10, 1979

[54] POLLING AND DATA COMMUNICATION SYSTEM HAVING A PULSE POSITION TO BINARY ADDRESS CONVERSION CIRCUIT

[75] Inventor: Charles G. Diefenderfer, Elkins Park, Pa.

[73] Assignee: Honeywell Inc., Minneapolis, Minn.

[21] Appl. No.: 812,692

[22] Filed: Jul. 5, 1977

Related U.S. Application Data

[63] Continuation of Ser. No. 723,156, Sep. 14, 1976, abandoned.

[51] Int. Cl.² .......................... H04Q 5/00; H04J 3/00
[52] U.S. Cl. ........................ 340/147 R; 179/15 AL; 340/167 R; 340/152 R
[58] Field of Search ................... 340/147 R, 151, 152, 340/167 R, 168 R, 167 B; 179/15 AL; 178/2 R, 2 C, 2 D

[56] References Cited

U.S. PATENT DOCUMENTS

| | | | |
|---|---|---|---|
| 3,427,589 | 2/1969 | Robinson et al. | 340/147 R |
| 3,723,971 | 3/1973 | Betts et al. | 340/147 R |
| 3,752,932 | 8/1973 | Frisone | 179/15 AL |
| 3,866,175 | 2/1975 | Seifert, Jr. et al. | 340/152 |
| 3,870,825 | 3/1975 | Roberts et al. | 179/15 AL |
| 3,921,137 | 11/1975 | McClearn, Jr. et al. | 340/147 R |
| 3,990,036 | 11/1976 | Savit | 179/15 AL X |

OTHER PUBLICATIONS

IBM Technical Disclosure Bulletin, vol. 16, No. 1, Jun. 1973, "Rapid Polling for Loops or Multidrop Systems with Priorities", T. F. Piatkowski, et al.

Primary Examiner—Donald J. Yusko
Attorney, Agent, or Firm—Laurence J. Marhoefer; Lockwood D. Burton; Mitchell J. Halista

[57] ABSTRACT

A poll command is sent by a central station to a plurality of remote stations connected along a data highway system. Upon receipt of the poll command, a remote station which desires to transmit data to the central station, responds with a reply pulse in a specific time position following the poll command. The position of the reply pulse is measured relative to the end of the poll command from the central station. Upon transmission of the poll command by the central station, a counter is started at the central station to count clock pulses arranged to occur at the end of each possible reply pulse position. Upon receipt of a reply pulse from a remote station, the count in the counter, which represents the binary address of the replying station, is stored in a memory and a memory address counter is incremented to control the storing of successive binary addresses in consecutive memory locations.

21 Claims, 7 Drawing Figures

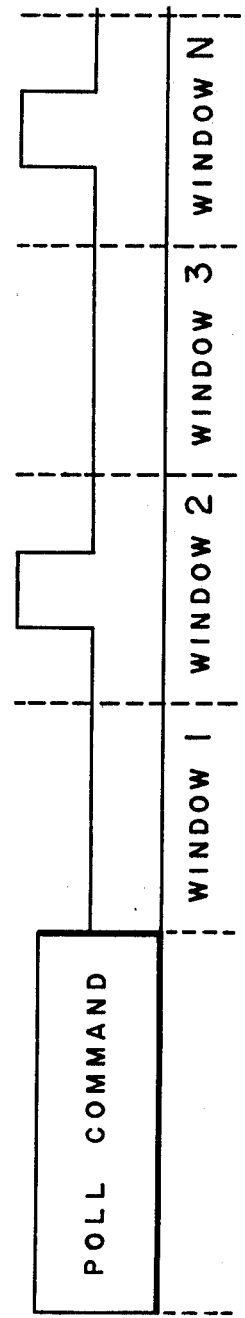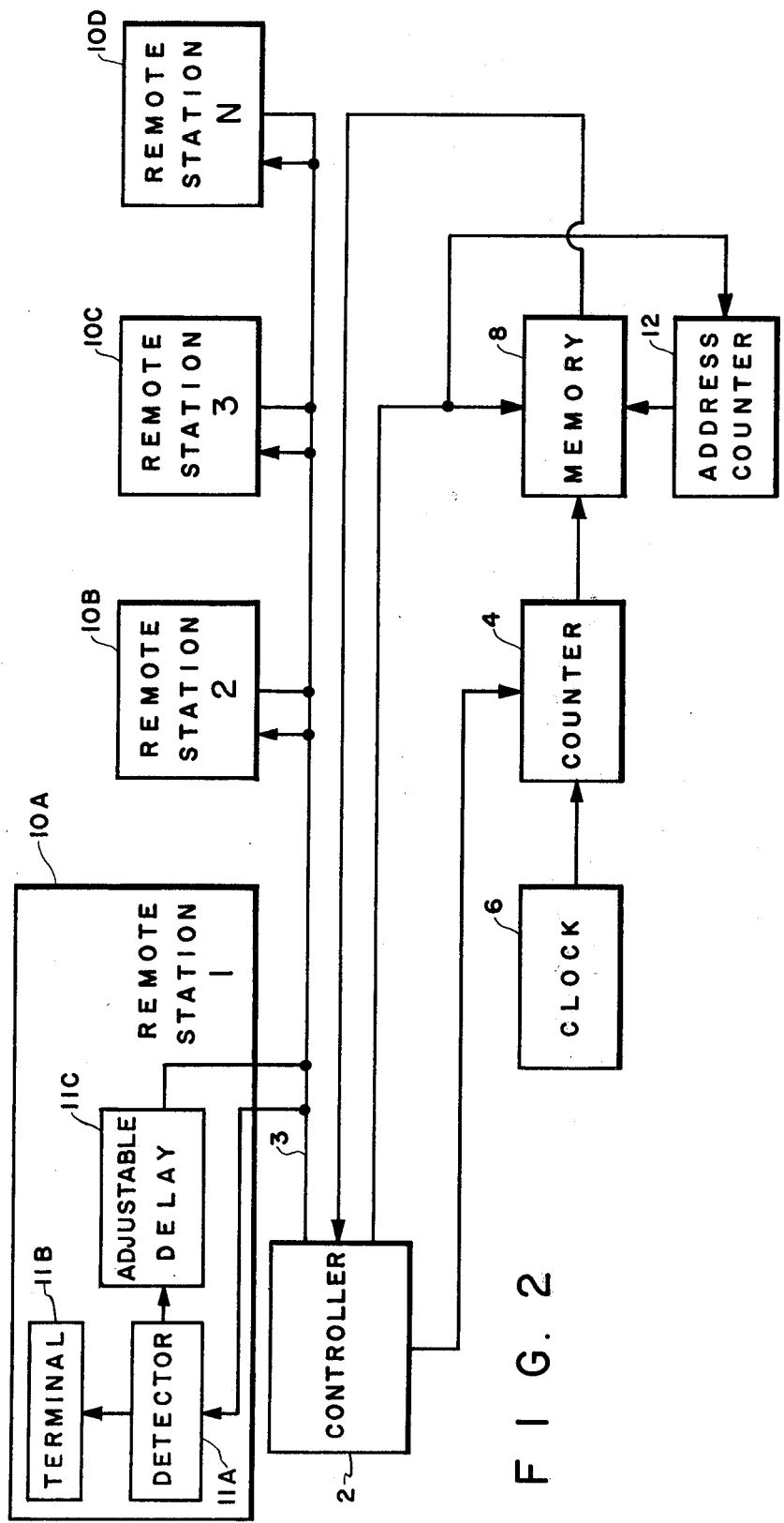

POLLING AND DATA COMMUNICATION SYSTEM HAVING A PULSE POSITION TO BINARY ADDRESS CONVERSION CIRCUIT

This is a continuation of application Ser. No. 723,156 filed on Sept. 14, 1976. now abandoned.

BACKGROUND OF THE INVENTION

1. Field of the Invention

The present invention relates to communication systems. More specifically, the present invention is directed to a data communication system enabling a central station to communicate with remote stations by identifying and addressing remote stations having data to send to the central station.

2. Description of the Prior Art

In a conventional communication system a plurality of remote stations are located in consecutive positions in a serial arrangement on a data highway with a central station requesting a reply from each remote station desiring to use the data highway. In order to receive data from the remote stations, the central station is arranged to send a coded request to each remote station. Upon receipt of the coded request, a remote station identified by the particular request code being transmitted will respond with a data signal on the data highway if the remote station has data to transmit to the central station. In order to identify the remote stations issuing reply data signals on the data highway, the reply data signals are coded to correlate the remote station with the data being supplied for use by the central station. Such a prior art system requires the serial interrogation of each remote station by the central station whether or not the remote station being interrogated has data to transmit to the central station. This interrogation is wasteful of the use of the data highway as well as the time alloted for servicing of the remote stations.

SUMMARY OF THE INVENTION

An object of the present invention is to provide an improved communication system for identifying remote stations requiring serving by a central station without a serial interrogation of each remote station.

Another object of the present invention is to provide an improved pulse position to binary address conversion circuit.

In accomplishing these and other objects, there has been provided, in accordance with the present invention, a communication system for a central station and a plurality of remote stations and having a pulse position to binary address conversion circuit. The conversion circuit includes a counter driven by a clock signal having a frequency rate corresponding to time spaced remote station reply pulse positions. The remote stations and the central station are connected to a data highway which serially connects a plurality of remote stations to the central station. The counter is started after the end of transmission of a poll command on the data highway from the central station to the remote stations. The clock pulses occurring during the time spaced reply pulse positions for the reply pulses from the remote stations are counter by the counter. Upon receipt of a reply pulse from a remote station, the count in the counter at the time of the receipt of the reply pulse is transferred to a digital memory. Concurrently, the memory address counter is incremented to provide successive storage of counts supplied by the counter for succeeding reply pulses in consecutive memory locations.

BRIEF DESCRIPTION OF THE DRAWINGS

A better understanding of the present invention may be had from the following detailed description is read in connection with the accompanying drawings, in which:

FIG. 1 is a timing diagram showing the relationships of the central station poll command and remote station reply signals, FIG. 2 is a block diagram illustration of a pulse conversion circuit embodying the present invention.

DESCRIPTION OF THE PREFERRED EMBODIMENT

Detailed Description

Figure 3:
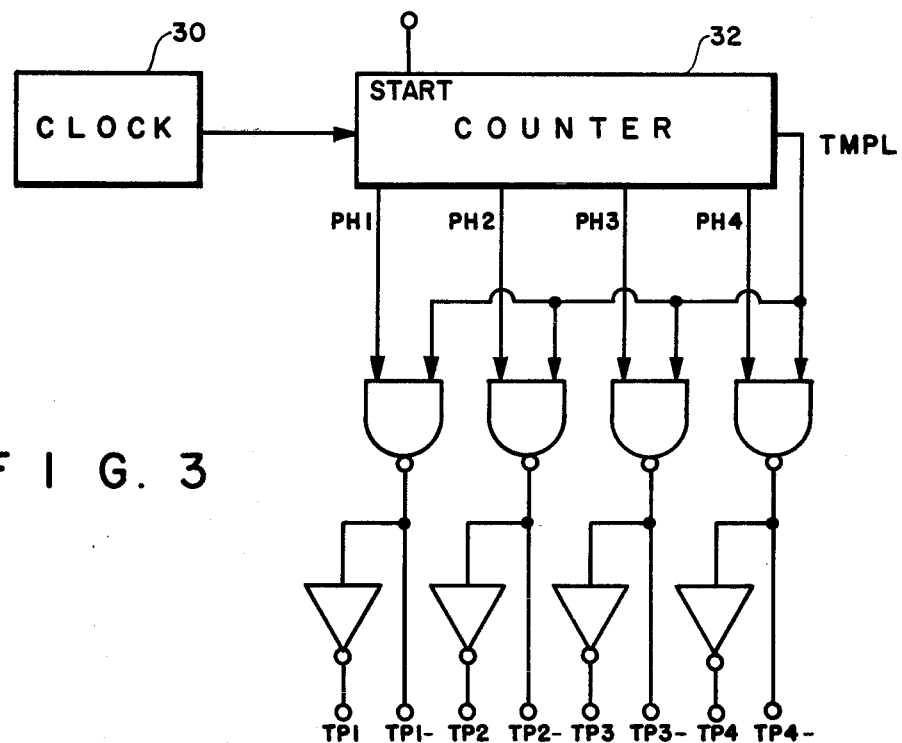
FIG. 3 is a detailed schematic illustration of a logic diagram for a clock signal generating circuit suitable for use with the present invention.

Referring to FIG. 1 in more detail, there is shown a timing diagram of the time related positions of the reply signals from a plurality of remote station and the poll command from a central station as used in the present invention. The poll command is issued by the central station and is applied to a bidirectional data highway having the remote stations arranged serially thereon. The time windows, or reply signal positions, occurring after the end of the poll command correspond in number to the number of remote stations. The length of each window is selected to allow an adequate response time for a remote station while maintaining the entire time used for the polling operation within the allotted specifications for the data highway system. A typical length for each time window would be eight microseconds for a system using twenty-eight remote stations and a polling operation every ten milliseconds. The length of each reply signal from the remote station would, accordingly, be arranged to be compatible with the eight microsecond time slot, or reply window.

Referring to FIG. 2, there is shown an overall block diagram of the pulse position to binary address conversion system of the present invention. A central station controller 2 at a central station is arranged to transmit a poll command, i.e., a digital word, on a bidirectional data highway 3 and to concurrently enable a window counter 4 to count clock signals from a clock source 6. The poll command is applied to the data highway 3 on a regular basis as initiated by a timer in the controller 2 using the aforesaid ten millisecond timing. The clock signal for the window counter 4 is arranged to have a repetition frequency equal to the occurrence time of each reply signal time slot, or window, shown in FIG. 1. The clock signal is applied to the window counter 4 following the end of the poll command signal from the central station controller. The counter output is connected to a memory 8 to enable the stored binary count in the window counter 4 to be stored in the memory 8. The memory 8 may be a conventional bipolar memory such No. 7489 manufactured by Texas Instruments, Houston, Tex.

The poll command is applied to each of a plurality of remote stations 10A to 10D which interpret the digital word by means of respective code detectors. The output signal of the detectors representing the receipt of a poll command at each of the remote stations 10A to 10D is arranged to produce a reply pulse for transmission to the central controller 2 if the respective remote station requires servicing by the central controller 2. A signal delay at each of the remote stations is located in the respective reply pulse path and is initially adjusted when the remote station is attached to the data highway 3 to enable the reply pulse from a remote station to be delayed before being applied to the data highway 3 by a fixed delay following the receipt of the poll command. In a preferred embodiment, each of the remote stations 10A to 10D is arranged to reply in the time window corresponding to the serial physical position of the remote station along the data highway 3, e.g., the third remote station along the data highway 3 from the central controller 2 is arranged to reply in the third time window following the poll command. This adjustment of the signal delay at each of the remote stations 10A to 10D is retained until either the location of the remote station is altered to change its position along the data highway 3 or new remote station is introduced into the system either as an addition or substitution. A typical remote station is shown in station 10A wherein a conventional detector 11A responsive to the coded poll command receives the signals from the data highway 3 and produces output signals to either a variable delay circuit 11C for transmission to the data highway as a reply signal or a terminal device 11B, e.g., a value controller, arranged to use the detected commands from the central controller 2.

A reply pulse from each of the remote station 10A, 10B, 10C, 10D is applied via the controller 2 to the memory 8 to enable the storage operation of the stored count in the window counter 4 and to an address counter 12 to increment the address counter 12 to the next storage address of the memory 8. The address counter 12 and the window counter 4 can each include a 74161 unit as made by Texas Instruments. The incrementation of the address counter 12 provides for an address or consecutive memory location to store successive transferred binary counts from the window counter 4 in consecutive memory locations. The memory locations can be subsequently sequentially read to detect the presence of a stored binary count which identifies the remote station signalling back along the data highway following the poll command. The stored information in the memory 8 is subsequently used as a binary address for the remote station to request data therefrom during a data gathering operation (not shown) of the system shown in FIG. 2.

Figure 4:
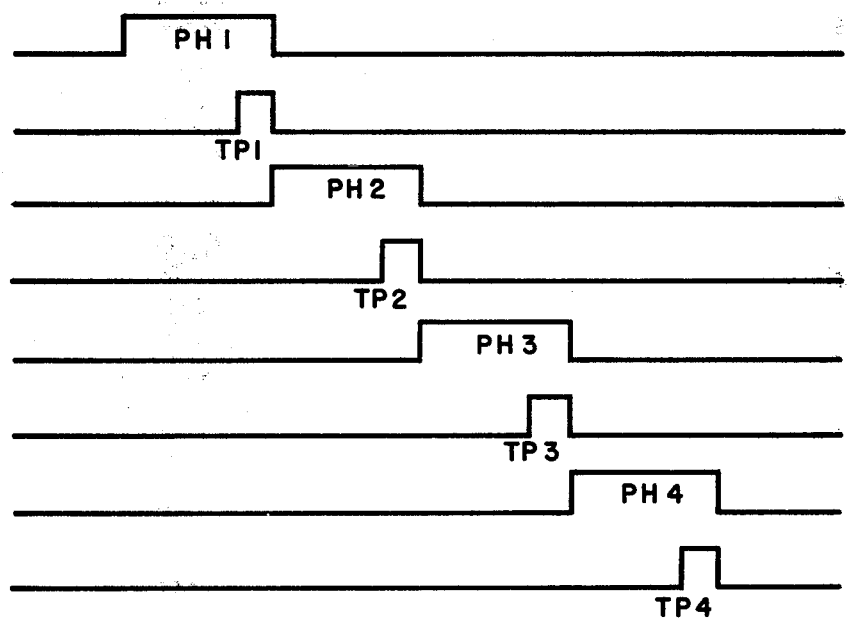
FIG. 4 is a timing diagram for the clock signals produced by clock signal circuit shown in FIG. 3.

The frequency of the clock signals from the clock signal generator and the synchronizing, or timing, signals are interrelated since they are derived from a clock signal generator which is used to provide count signals from the window counter 4 and the timing signals for the address counter 12 and the memory 8. The circuit shown in FIG. 3 is an example of typical logic diagram for a clock signal generator circuit arranged to produce subdivided frequency output signals as output signals having a predetermined phase and timing relationship to clock signal generator output signals. Briefly, a clock signal generator 30 is arranged to apply fixed frequency output signals to a counter 32 while the resulting count signals shown as counter output signals are each applied to respective ones of a plurality of NAND gates 33, 34, 35, 36. The gating of these counter output signals through the NAND gates 33 to 36 is delayed until the occurrence of the timing pulse TMPL representing a clock signal transferred through the counter 32. The timing pulse TMPL, accordingly, occurs at a higher frequency than the counter output signals to be gated through the NAND gates 33 to 36. Thus, the signals actually gated through the NAND gates 33 to 36 are portions of the count output signals from the counter 32. These NAND gate output dignals are used either directly or after a logical inversion by logic inverters 37, 38, 39 and 40, respectively. In FIG. 4, there is shown a waveshape diagram of the counter output signals and the resulting timing pulses derived from the counter output signals by means of the frequency dividing circuit shown in FIG. 3.

Figure 5:
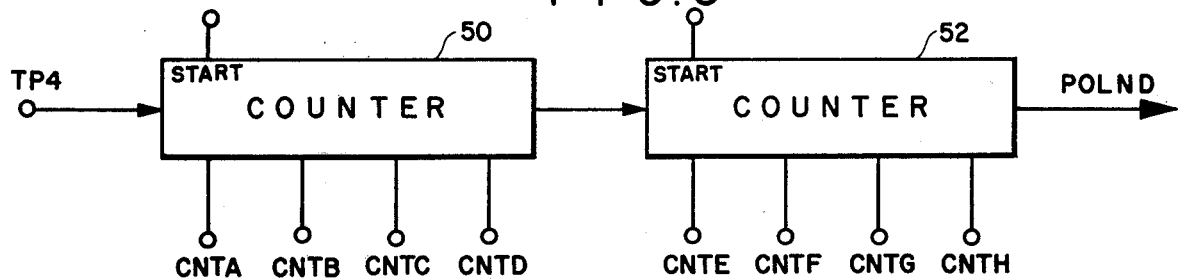
FIG. 5 is a block diagram of a counter circuit suitable for use with the present invention.
Figure 6:
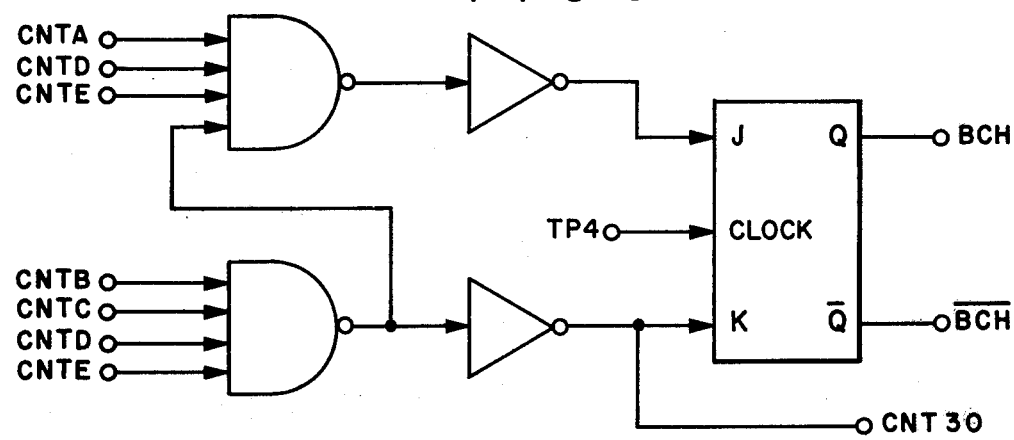
FIG. 6 is a logic diagram of a typical signal gating circuit suitable for use with the present invention.

In FIG. 5, there is shown a counter circuit suitable for use as the window counter 4 shown in FIG. 2. Thus, the input signal for the window counter 4 is selected from one of the timing pulses produced by the circuit of FIG. 3, i.e., the circuit of FIG. 3 is used as the clock 6 and is applied to the input of a first counter 50. The output of the first counter 50 is applied to the input of a second counter 52 with the counter output signals of the first and second counters 50 and 52 being sequentially identified. The output signals from the counter circuit shown in FIG. 5 may be used in a conventional gating circuit such as that shown in FIG. 6 to derive further control signals, e.g., BCH and $\overline{BCH}$ and CNT 30 under control of timing signal TP4. The use of such logic circuits is well known in the art and further explanation of their operation is believed to be unnecessary.

Figure 7:
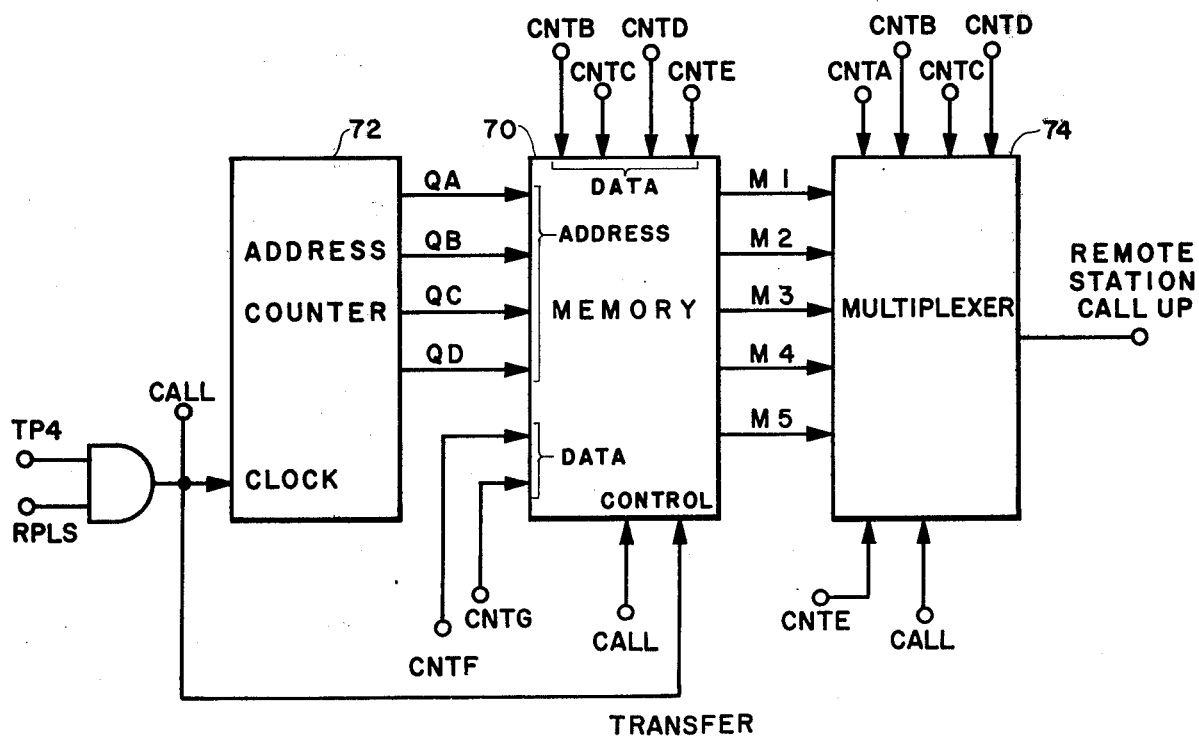
FIG. 7 is a block diagram of the memory portion of the system shown in FIG. 2.

In FIG. 7, there is shown a block diagram of a circuit for entering the count signals from the counter circuit shown in FIG. 5 to a memory circuit 70 under control of an address counter 72 which is arranged to count one of the timing pulses TP4 derived from the circuit shown in FIG. 3. The memory 70 is a conventional device which includes a storage circuit, a decoder for the control signals from the address counter 72 and driver circuits for reading and storing input signals under control of the decoder, such devices being well-known in the art, as exemplified by the 7489 unit previously mentioned. This timing pulse TP4 is arranged to be at a frequency to enable one timing pulse to be produced for each of the signal windows shown in FIG. 1. The adress counter 72 is arranged to count the timing pulse TP4 under control of the reply pulse RPLS received from the remote stations. Thus, the address counter 72, is incremented by one count for each of the reply signals received from a remote station. This enables the address counter 72 to address consecutive storage locations in the memory 70. The count signals from the window counter 4 shown in FIG. 5 are applied to the memory 70 to be stored therein under control of a transfer signal produced by the controller 2 in response to a reply from a remote station. Thus, the binary count from the window counter 4 which identifies a remote station replying on the data highway is stored in the memory 70 at a memory location as determined by the address counter 72. During a subsequent operation of the memory circuit when it is desired to read out the station identifications stored in the memory 70 a call signal is applied to the memory 70 to read out the stored information which is applied to a multiplexer circuit 74. The multiplexer 74 can be a Texas Instruments 74150 unit. The multiplexer 74 is effective to apply the output signal from the memory 70 to a multiplexer output line under control of the count signals from the counter circuit shown in FIG. 5 and a call signal applied to the multiplexer 74 from the controller 2. The output from the multiplexer 74 is than applied to the data highway 3 to be sent to the remote stations 10A to 10D as a control signal which is decoded by the remote stations 10A to 10B and used to enable the remote station identified thereby to respond, e.g., to transfer its stored data onto the data highway 3 for transmission to the controller 2.

Accordingly, it may be seen that it may be provided in accordance with the present invention, a communication system having a pulse position to binary address conversion circuit to enable a central station to identify remote stations requesting communication with the central station.

The embodiments of the invention in which an exclusive property of privilege is claimed are defined as follows:

1. A pulse position to binary address converter for converting a physical position of a remote station on a data highway to a binary address for addressing the remote station comprising
   a bidirectional data highway,
   a plurality of remote stations connected to said data highway at spaced locations thereon, said remote stations each including means responsive to a poll command on said data highway for issuing a reply signal to a predetermined time following a reception of said poll command corresponding to the physical location for each of said remote stations,
   controller means for issuing a poll command onto said data highway,
   clock signal generating means,
   bit counter means arranged to count clock signals from said clock signal generating means,
   memory means connected to said counter means and
   address counter means connected to said memory means to address storage locations in said memory means, said controller means being responsive to said reply signal from each of said remote stations to produce a corresponding transfer control signal which is applied to said memory means for enabling said memory means to transfer the count stored in said bit counter means at the time of the application of said transfer control signal to said memory means to a memory location as determined by a count stored in said address counter means and circuit means for applying each of said transfer control signals to said address counter means to increment the count stored in said address counter means following each transfer of a count from said bit counter to said memory means whereby each stored count in said memory means is a binary address of a corresponding remote station.

2. A pulse position to binary address converter as set forth in claim 1 and including a multiplexer circuit connected to said memory means for receiving stored count signals from storage locations in said memory means and for transferring said stored count signals to a multiplexer output line and circuit means connecting said multiplexer output line to said controller means to enable said controller means to apply said output signal on said multiplexer output line to said data highway to address a remote station connected to said data highway.

3. A converter as set forth in claim 1 wherein said means responsive to a poll command each include a signal detector connected to said data highway for detecting the poll command to produce a corresponding output signal and adjustable signal delay means connected between said signal detector and said data highway for applying said output signal to said data highway as said reply signal after a predetermined delay time.

4. A converter as set forth in claim 1 wherein said remote stations are each arranged to respond during a corresponding time window following the poll command with the number of time windows being at least equal to the number of remote stations and the clock signal generating means is arranged to produce a clock signal for each of the time windows.

5. A data communication system for converting a relative position of a remote station on a data highway to a binary address for addressing the remote station comprising
   a bidirectional data highway,
   a plurality of remote stations connected to said data highway at spaced locations thereon, said remote stations each including means responsive to a poll command on said data highway for issuing a reply signal at a predetermined time following said poll command corresponding to the relative position on said data highway for each of said remote stations,
   controller means for issuing a poll command onto said data highway,
   clock signal generating means,
   bit counter means arranged to counter clock signals from said clock signal generating means,
   memory means connected to said counter means and to said controller means,
   address counter means connected to said memory means to address storage locations in said memory means, said controller means being responsive to said reply signal from each of said remote stations to produce a corresponding transfer control signal which is applied to said memory means to transfer the count stored in said bit counter means at the time of the application of said transfer control signal to said memory means to a memory location as determined by a count stored in said address counter means and
   circuit means for applying each of said transfer control signals to said address counter means to increment the count stored in said address counter means following each transfer of a count from said bit counter to said memory means whereby each stored count in said memory means is a binary address of a corresponding remote station.

6. A data communication system as set forth in claim 5 and including a multiplexer circuit connected to said memory means for receiving stored count signals from storage locations in said memory means and for transferring said stored count signals to a multiplexer output line and circuit means connecting said multiplexer output line to said controller means to enable said controller means to apply said output signal on said multiplexer output line to said data highway to address a remote station connected to said data highway.

7. A data communication system as set forth in claim 5 wherein said means responsive to a poll command each include a signal detector connected to said data highway for detecting the poll command to produce a corresponding output signal and adjustable signal delay means connected between said signal detector and said data highway for applying said output signal to said data highway as said reply signal after a predetermined delay time.

8. A data communication system as set forth in claim 5 wherein said remote stations are each arranged to respond during a corresponding time window following the poll command with the number of time windows being at least equal to the number of remote stations and the clock signal generating means is arranged to produce a clock signal for each of the time windows.

9. A data communication system for converting a relative position of a remote station on a data highway to a binary address for addressing the remote station comprising a bidirectional data highway, controller means connected to said data highway for issuing a poll command onto said data highway, a plurality of remote stations connected to said data highway, said remote stations each including means responsive to said poll command on said data highway for selectively issuing a reply signal at a predetermined time following a reception of said poll command corresponding to the relative position on said data highway for each of said remote stations, and address generating means connected to said controller means for converting each time duration between said poll command and each of said reply signals from said remote stations to corresponding addresses for each of said remote stations issuing said reply signal.

10. A data communication system as set forth in claim 9 wherein said address generating means includes memory means for storing each of said addresses.

11. A data communication system as set forth in claim 10 wherein said memory means includes memory address means for storing each of said addresses in consecutive memory locations.

12. A method of converting a plurality of remote station relative positions on a data highway to separate binary addresses comprising the steps of issuing a command on the data highway to the remote stations, starting a counting by a counter of the output signals from a clock source following the end of said command, effecting a reply signal on the data highway from each remote station to said command at a time following a reception of said command corresponding to a relative position of each of said remote stations on said data highway, transferring the count stored in the counter to a memory upon the occurrence of a reply pulse from the remote station and concurrently incrementing a memory address register to store successive counts from the counter in consecutive memory locations.

13. A method as set forth in claim 12 and including the further step of sequentially reading the consecutive memory locations in said memory to obtain respective addresses for said remote stations.

14. A method as set forth in claim 12 wherein said reply signals are effected in a time sequence corresponding to the physical sequence of said remote stations on said data highway.

15. A method as set forth in claim 12 wherein said reply signals are each arranged to issue during a respective time window with the number of time windows corresponding with the number of remote stations.

16. A method as set forth in claim 15 wherein each of said output signals from said clock source is arranged to occur during a respective one of the time windows.

17. A method as set forth in claim 16 wherein each of said reply signals is arranged to occur in a time window corresponding to the physical sequence of a respective one of said remote stations on said data highway.

18. A method of converting a plurality of remote station relative positions on a data highway to separate respective binary addresses comprising the steps of issuing a command on the data highway to the remote stations, selectively effecting a reply signal on the data highway from each remote station to said command at a time following a reception of said command corresponding to a relative position of each of said remote stations on said data highway; and converting each time duration between said command and each of said reply signals from said remote stations to corresponding addresses for each of said remote stations issuing said reply signal.

19. A method as set forth in claim 18 and including the further step of storing said addresses in a memory.

20. A method as set forth in claim 19 wherein said addresses are stored in consecutive memory locations in said memory.

21. A method as set forth in claim 20 and including the further step of sequentially reading the consecutive memory locations in said memory to obtain respective addresses for said remote stations issuing said reply signal.

* * * * *